United States Patent
Takahashi et al.

(10) Patent No.: US 8,189,128 B2
(45) Date of Patent: May 29, 2012

(54) LIQUID CRYSTAL DISPLAY HAVING FIRST AND SECOND DIFFUSION MEMBERS AND A PLURALITY OF SENSORS THAT CAN DETECT A SENSING SIGNAL REFLECTED FROM AN OBJECT

(75) Inventors: Seiki Takahashi, Chunan-si (KR); Bong-Hyun You, Yongin-si (KR); Hee-Jin Choi, Seoul (KR); Sang-Soo Kim, Seoul (KR); Yong-Hwi Kim, Anseong-si (KR)

(73) Assignee: Samsung Electronics Co., Ltd. (KR)

( * ) Notice: Subject to any disclaimer, the term of this patent is extended or adjusted under 35 U.S.C. 154(b) by 631 days.

(21) Appl. No.: 12/243,574

(22) Filed: Oct. 1, 2008

(65) Prior Publication Data
US 2009/0231497 A1    Sep. 17, 2009

(30) Foreign Application Priority Data
Mar. 14, 2008    (KR) .................. 10-2008-0023847

(51) Int. Cl.
G02F 1/1335    (2006.01)
G06F 3/042    (2006.01)
(52) U.S. Cl. .................. 349/12; 349/64; 345/175
(58) Field of Classification Search ............... 349/1, 64; 382/190; 345/82, 84, 87, 173, 175
See application file for complete search history.

(56) References Cited

U.S. PATENT DOCUMENTS

| | | | | |
|---|---|---|---|---|
| 5,691,788 A | * | 11/1997 | Kim | 349/96 |
| 6,243,069 B1 | | 6/2001 | Ogawa et al. | |
| 6,661,478 B1 | * | 12/2003 | Wakahara | 349/58 |
| 2006/0038935 A1 | * | 2/2006 | Kim | 349/64 |
| 2007/0200970 A1 | * | 8/2007 | Keam et al. | 349/58 |
| 2008/0121442 A1 | * | 5/2008 | Boer et al. | 178/18.09 |
| 2008/0246708 A1 | * | 10/2008 | Ishiguro | 345/87 |

FOREIGN PATENT DOCUMENTS

| | | |
|---|---|---|
| EP | 2130111 | 12/2009 |
| JP | 05075786 | 3/1993 |
| KR | 1020020060626 | 7/2002 |
| WO | 2007026462 | 3/2007 |
| WO | 2008121906 | 10/2008 |

OTHER PUBLICATIONS

Hodges et al; "ThinSight: Versatile Multi-touch Sensing for Thin Form-factor Displays"; 2007, pp. 259-268; XP007905450. Partial European Search Report for application No. 09001470.5-1228 dated Feb. 11, 2011.
Extended European Search Report for application No. 09001470.5-1228 dated Jul. 6, 2011.

* cited by examiner

*Primary Examiner* — Mark Robinson
*Assistant Examiner* — Paul Lee
(74) *Attorney, Agent, or Firm* — Cantor Colburn LLP

(57) ABSTRACT

A liquid crystal display includes: a liquid crystal panel; a plurality of first light sources disposed below the liquid crystal panel; a first diffusion member disposed between the liquid crystal panel and the first light sources; a plurality of second light sources disposed below the liquid crystal panel and which emit a sensing signal toward the liquid crystal panel; and a plurality of sensors disposed in or below the liquid crystal panel. The sensing signal emitted from the plurality of second light sources toward the liquid crystal panel is reflected by an object disposed above the liquid crystal panel and is detected by the plurality of sensors before transmitting through the first diffusion member away from the liquid crystal panel such that a shape of the object is determined based on the sensing signal reflected from the object and detected by the plurality of sensors.

10 Claims, 14 Drawing Sheets

LIQUID CRYSTAL DISPLAY HAVING FIRST AND SECOND DIFFUSION MEMBERS AND A PLURALITY OF SENSORS THAT CAN DETECT A SENSING SIGNAL REFLECTED FROM AN OBJECT

This application claims priority to Korean Patent Application No. 10-2008-0023847, filed on Mar. 14, 2008, and all the benefits accruing therefrom under 35 U.S.C. §119, the contents of which in its entirety are herein incorporated by reference.

BACKGROUND OF THE INVENTION

1. Field of the Invention

The present invention relates to a liquid crystal display ("LCD"), a display system including the LCD and a method of recognizing an object using the LCD. More particularly, the present invention relates to an LCD having an improved user interface, a display system including the LCD and a method of recognizing the shape of an object using the LCD.

2. Description of the Related Art

Various types of liquid crystal displays ("LCDs") such as touch screen panels, for example, which provide an easy interface between a user and a display device, have been developed to enhance user convenience. Touch screen panels are generally classified as either a capacitive touch screen panel, a resistive touch screen panel or a surface ultrasonic wave touch screen panel.

A capacitive touch screen panel typically includes a transparent conductive film or glass, and calculates coordinates of a touch point by detecting an amount of charge accumulated between a pen-type input unit, such as a stylus, and the conductive film or glass. A typical resistive touch screen panel includes two conductive layers which face each other, and calculates coordinates of a touch point by applying a voltage to the two conductive layers and detecting a variation in the voltage or a current of the conductive layers when a user presses the resistive touch screen panel, thereby causing the two conductive layers to contact each other. Generally, a surface ultrasonic wave touch screen panel includes a transmitter disposed on one side of the surface ultrasonic wave touch screen panel to emit ultrasonic waves, and a receiver disposed on an opposite side of the surface ultrasonic wave touch screen panel to recognize a position of ultrasonic waves output from the transmitter based on an interference of the ultrasonic waves by a user pressing the surface ultrasonic wave touch screen panel.

However, an improved, e.g., easier and more convenient, interface between a user and a display device, relative to the abovementioned interfaces, is desired.

BRIEF SUMMARY OF THE INVENTION

Exemplary embodiments of the present invention provide a liquid crystal display ("LCD"), which recognizes an object and, more particularly, a shape of the object, disposed proximate to a liquid crystal panel of the LCD.

Exemplary embodiments of the present invention also provide a display system including the LCD.

Exemplary embodiments of the present invention further provide a method of recognizing the shape of the object using the LCD.

According to an exemplary embodiment of the present invention, an LCD includes: a liquid crystal panel; a plurality of first light sources disposed below the liquid crystal panel; a first diffusion member disposed between the liquid crystal panel and the plurality of first light sources; a plurality of second light sources disposed below the liquid crystal panel and which emits a sensing signal toward the liquid crystal panel; and a plurality of sensors disposed in or below the liquid crystal panel. The sensing signal emitted from the plurality of second light sources toward the liquid crystal panel is reflected away from the liquid crystal panel toward the plurality of sensors by an object disposed above the liquid crystal panel, and is detected by the plurality of sensors before transmitting through the first diffusion member away from the liquid crystal panel. A shape of the object is determined based on the sensing signal reflected from the object and detected by the plurality of sensors.

According to an alternative exemplary embodiment of the present invention, a display system includes a liquid crystal display which displays an image using a liquid crystal panel, recognizes a shape of an object on the liquid crystal panel based on a sensing signal and provides object shape information regarding the object to a central processing device. The central processing device receives the object shape information and performs signal processing on the object shape information. The LCD includes a liquid crystal panel; a plurality of first light sources disposed below the liquid crystal panel; a first diffusion member disposed between the liquid crystal panel and the plurality of first light sources; a plurality of second light sources disposed below the liquid crystal panel and which emits a sensing signal toward the liquid crystal panel; and a plurality of sensors disposed in or below the liquid crystal panel. The sensing signal emitted from the plurality of second light sources toward the liquid crystal panel is reflected away from the liquid crystal panel toward the plurality of sensors by an object disposed above the liquid crystal panel, and is detected by the plurality of sensors before transmitting through the first diffusion member away from the liquid crystal panel. A shape of the object is determined based on the sensing signal reflected from the object and detected by the plurality of sensors.

According to another alternative exemplary embodiment of the present invention, a method of recognizing a shape of an object using an LCD having a liquid crystal panel includes: dividing the liquid crystal panel into a plurality of active regions; emitting a sensing signal through the liquid crystal panel; sensing detected sensing signals reflected from the object for each active region of the plurality of active regions; determining corrected portions of the detected sensing signals based on overlapping areas disposed between the active regions; generating object shape information regarding the object based on the corrected portions of the detected sensing signals; and outputting the object shape information to determine the shape of the object.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
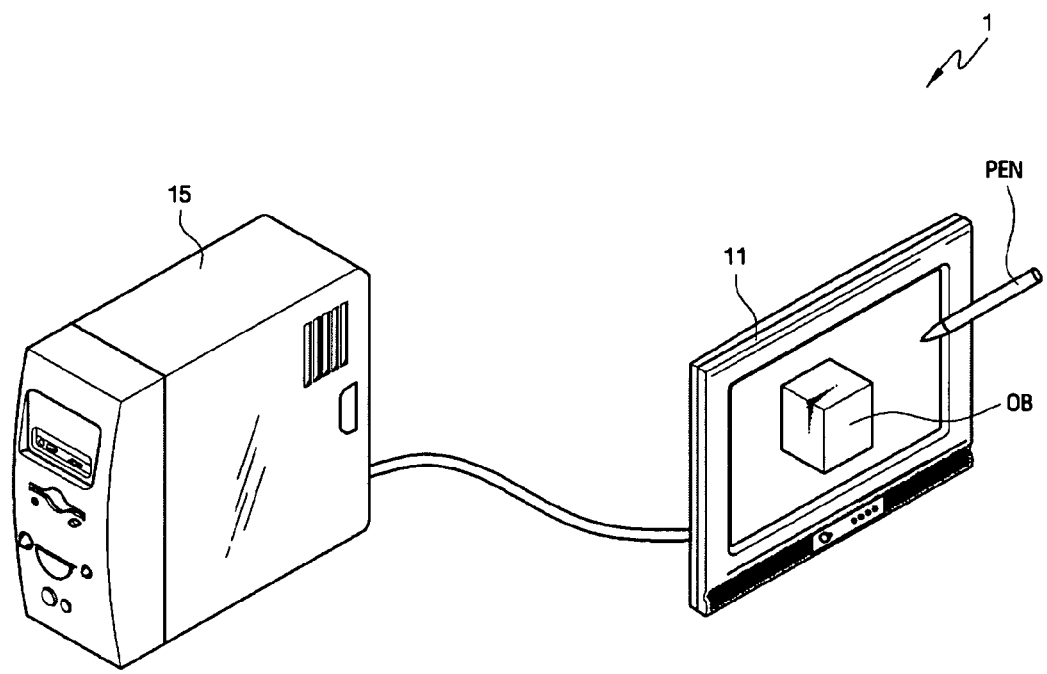
FIG. 1 is a perspective view of a display system according to an exemplary embodiment of the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items. It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

A liquid crystal display ("LCD") according to an exemplary embodiment of the present invention and a display system including the LCD, according to an exemplary embodiment of the present invention will now be described in further detail with reference to FIG. 1.

FIG. 1 is a perspective view of a display system 1 according to an exemplary embodiment of the present invention. Referring to FIG. 1, the display system 1 includes an LCD 11 and a central processing device 15.

Figure 5:
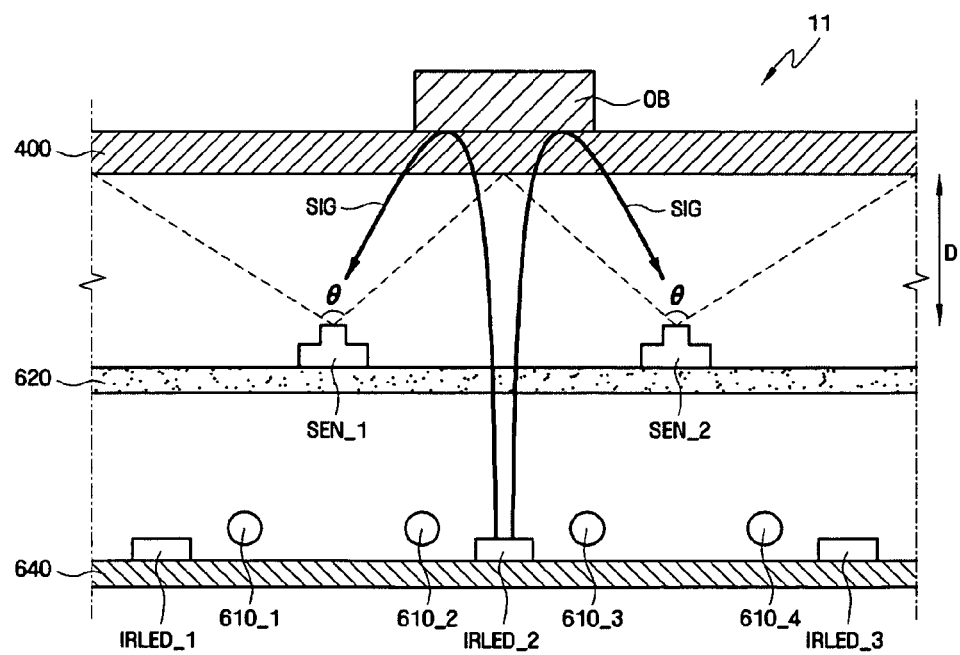
FIG. 5 is a partial cross-sectional view of an LCD according to an exemplary embodiment of the present invention taken along line IV-IV' of FIG. 2.

The LCD 11 according to an exemplary embodiment provides a substantially improved, e.g., easy and convenient, interface to a user. Specifically, when the user touches a liquid crystal panel 400 (FIG. 2) of the LCD 11 with a pen PEN, the LCD 11 outputs touch position information to the central processing device 15. In addition, the LCD 11 recognizes the shape of an object OB disposed proximate to the liquid crystal panel 400, and outputs object shape information regarding the object OB to the central processing device 15. More specifically, the LCD 11 recognizes the shape of the object OB disposed on the liquid crystal panel 400 using a sensing signal SIG (FIG. 5). In an exemplary embodiment of the present invention, the sensing signal SIG includes infrared rays or, alternatively, ultrasonic waves for example, but alternative exemplary embodiments are not limited thereto. Thus, the LCD 11 according to an exemplary embodiment emits the sensing signal SIG toward a front of the liquid crystal panel 400, and detects the sensing signal SIG reflected from the object OB, thereby determining a shape of the object OB, as will be described in further detail below.

The central processing device 15 performs signal processing on touch position information and/or the object shape information provided by the LCD 11. In an exemplary embodiment, the central processing device 15 is a computer, but alternative exemplary embodiments are not limited thereto.

As will now be described in further detail with reference to FIGS. 2 through 5, the LCD 11 includes the liquid crystal panel 400, a backlight unit including a plurality of light sources which emit light and/or the sensing signal SIG, and a plurality of sensors disposed on a rear surface of the liquid crystal panel 400 and which recognize the shape of the object OB by detecting infrared rays, for example, reflected from the object OB.

Figure 2:
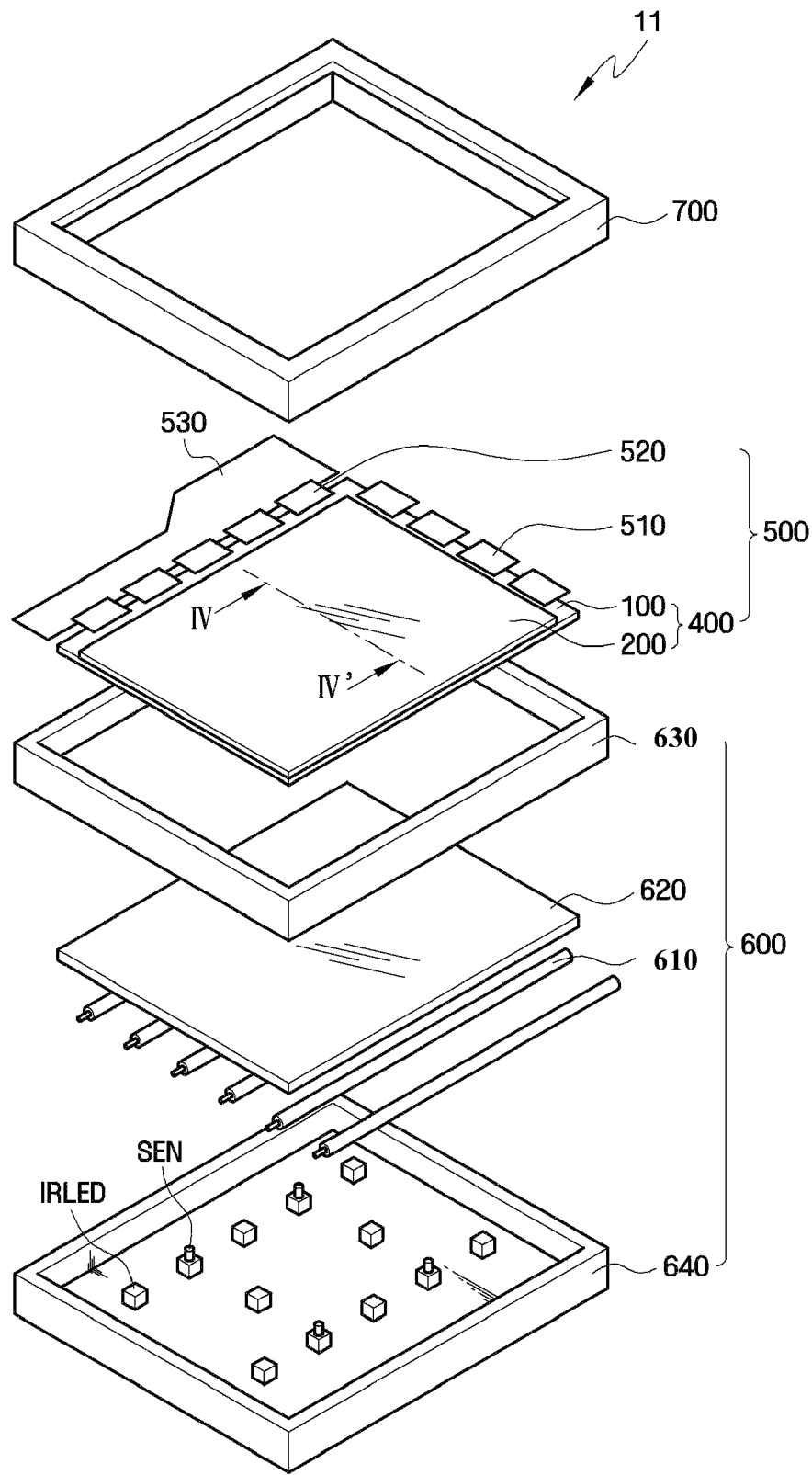
FIG. 2 is an exploded perspective view of a liquid crystal display ("LCD") according to an exemplary embodiment of the present invention.
Figure 3:
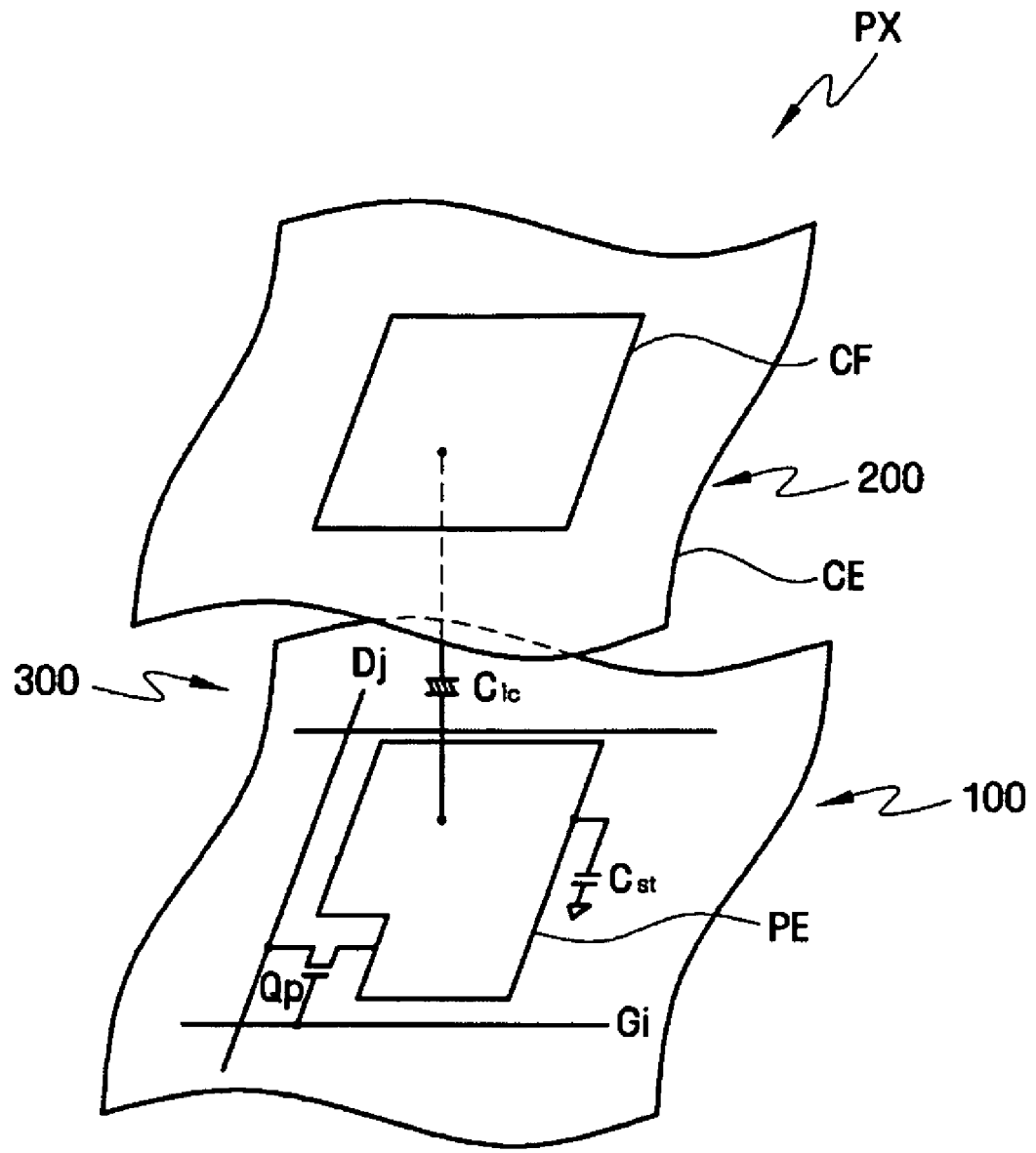
FIG. 3 is an equivalent circuit diagram of a pixel of the LCD according to the exemplary embodiment of the present invention shown in FIG. 2.
Figure 4:
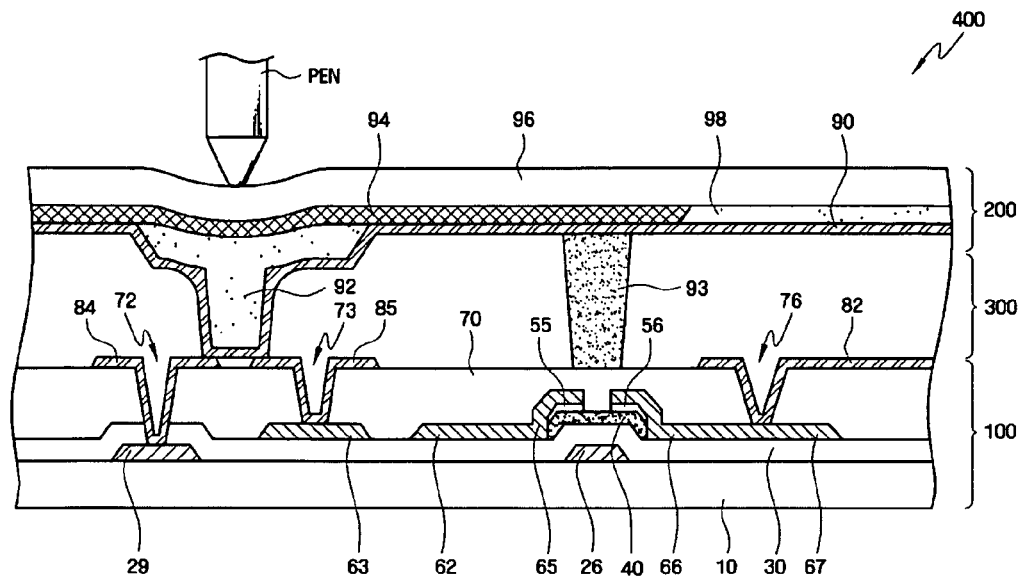
FIG. 4 is a partial cross-sectional view of a liquid crystal panel according to an exemplary embodiment of the present invention taken along line IV-IV' of FIG. 2.

FIG. 2 is an exploded perspective view of the LCD 11 according to an exemplary embodiment of the present invention, FIG. 3 is an equivalent circuit diagram of a pixel of the LCD 11 according to an exemplary embodiment of the present invention, FIG. 4 is a partial cross-sectional view of the liquid crystal panel 400 taken along line IV-IV' of FIG. 2 and FIG. 5 is a partial cross-sectional view of the LCD 11 taken along line IV-IV' of FIG. 2.

Referring to FIG. 2, the LCD 11 includes a liquid crystal panel assembly 500, a backlight unit 600 and a top chassis 700.

The liquid crystal panel assembly 500 includes the liquid crystal panel 400, a gate driver 510, a data driver 520 and a circuit board 530.

The liquid crystal panel 400 includes a first display panel 100, a second display panel 200 and a liquid crystal layer (not shown) interposed between the first display panel 100 and the second display panel 200. A plurality of gate lines (not shown), a plurality of data lines (not shown) and a plurality of pixel electrodes (not shown) are formed on the first display panel 100. A common electrode (not shown) is formed on the second display panel 200. Each pixel (not shown) includes a pixel electrode PE (FIG. 3) and a common electrode CE (FIG. 3) which is disposed opposite to, e.g., faces, the pixel electrode PE.

Referring to FIG. 3, a pixel PX is connected to an i-th gate line Gi and a j-th data line Dj, and includes a switching device Qp connected to the i-th gate line Gi and the j-th data line Dj, as well as a liquid crystal capacitor $C_{lc}$ and a storage capacitor $C_{st}$, which are both connected to the switching device Qp. The liquid crystal capacitor $C_1$, includes the pixel electrode PE, formed on the first display panel 100, and the common electrode CE formed on the second display panel 200, as shown in FIG. 3. A color filter CF is formed on the common electrode CE.

The liquid crystal panel 400 includes a plurality of pixels PX and displays an image. In addition, the liquid crystal panel 400 according to an exemplary embodiment recognizes, e.g., determines, a position of a touch, e.g., an external pressure, on the liquid crystal panel 400. The liquid crystal panel 400 will be described in further detail below with reference to FIG. 4.

Referring again to FIG. 2, the gate driver 510 and/or the data driver 520 may be attached to the liquid crystal panel 400 by being mounted on a flexible printed circuit film (not shown) as a tape carrier package ("TCP"). Alternatively, the gate driver 510 and/or the data driver 520 may be integrated on the liquid crystal panel 400 along with the plurality of gate lines, the plurality of data lines, and the switching devices Qp of each of the pixels PX.

The gate driver 510 applies a gate signal to the plurality of gate lines. The gate signal may be obtained by combining a gate-on voltage and a gate-off voltage, provided by a gate-on/off voltage generation module (not shown). The data driver 520 applies an image data voltage to the data lines.

A plurality of circuits for generating a gate control signal for controlling an operation of the gate driver 510, as well as a plurality of circuits for generating a data control signal for controlling the operation of the data driver 520, may be mounted on the circuit board 530. In an exemplary embodiment of the present invention, for example, a timing controller (not shown) may be mounted on the circuit board 530, but alternative exemplary embodiments are not limited thereto.

The liquid crystal panel assembly 500 is disposed above the backlight unit 600 and is provided with light by the backlight unit 600 to display an image thereon.

The backlight unit 600 according to an exemplary embodiment includes a side member 630, a first diffusion member 620, a plurality of first light sources 610, each first light source 610 of which emits light, a plurality of second light sources IRLED, each second light source IRLED of which emits a sensing signal SIG, and a plurality of sensors SEN.

The side member 630 supports the liquid crystal panel assembly 500, and contains the first diffusion member 620, the first light sources 610, the second light sources IRLED and the sensors SEN therein. Inner surfaces of the side member 630 reflect light emitted from the first light sources 610 and the sensing signal SIG emitted the second light sources IRLED. Alternatively, a reflective plate (not shown) may be attached the inner surfaces of the side member 630.

In an exemplary embodiment, a first diffusion member 620 is disposed above the first light sources 610. The first diffusion member 620 improves a uniformity of a luminance of light emitted from the first light sources 610.

The first light sources 610 are disposed at a rear portion of the liquid crystal panel 400, and emit light. In an exemplary embodiment of the present invention, the first light sources 610 may be cold cathode fluorescent lamps ("CCFLs"), external electrode fluorescent lamps ("EEFLs") or, alternatively, hot cathode fluorescent lamps ("HCFLs"). In an alternative exemplary embodiment, the first light sources 610 may be light-emitting diodes ("LEDs"). Further, the first light sources 610 may emit infrared rays, as well as visible rays, but alternative exemplary embodiments are not limited thereto.

The second light sources IRLED are disposed at the rear portion of the liquid crystal panel 400 and emit the sensing signal SIG. In an exemplary embodiment of the present invention, for example, the sensing signal SIG includes infrared rays and/or ultrasonic waves. Specifically, infrared rays are light having a long wavelength, e.g., a wavelength of approximately 0.75 μm or greater. Infrared rays may be used to recognize the shape of the object OB, which is disposed at a front portion of the liquid crystal panel 400, e.g., outside of the liquid crystal panel 400. Thus, the infrared rays according to an exemplary embodiment of the present invention have a wavelength sufficient to transmit through the liquid crystal panel 400. A portion of the infrared rays transmitted through the liquid crystal panel 400 reach the object OB and are reflected from the object OB back toward the second light sources IRLED.

In the exemplary embodiment of the present invention shown in FIG. 2, the first light sources 610 and the second light sources IRLED are separate light sources, but alternative exemplary embodiments of the present invention are not limited thereto. For example, the first light sources 610 and the second light sources IRLED maybe incorporated into single light sources (not shown) which emit both light and the sensing signal SIG. Further, the first light sources 610 and the second light sources IRLED may be mounted on a same board, e.g., a same circuit board in the LCD 11, and may further be mounted on a bottom chassis 640 of the LCD 11, as shown in FIG. 2.

The sensors SEN are disposed at the rear portion of the liquid crystal panel 400, detect the sensing signal SIG reflected from the object OB, and thus determine a shape of the object OB (FIG. 1). The sensors SEN according to an exemplary embodiment may be infrared sensors. Further, the sensors SEN may output object shape information regarding the object OB to the central processing device 15 (FIG. 1). An exemplary embodiment of the present invention includes a plurality of the sensors SEN, as shown in FIG. 2. Thus, a number and arrangement of the sensors SEN may vary based on a sensitivity of the sensors SEN, for example.

The bottom chassis 640 of the LCD 11 contains the side member 630, the first diffusion member 620, the first light sources 610, the second light sources IRLED and the sensors SEN therein. The bottom chassis 640 and the top chassis 700 contain the light crystal panel assembly 500 and the backlight unit 600 therebetween. In an exemplary embodiment of the present invention, the top chassis 700 is coupled to, e.g., is connected to, the bottom chassis 640 with hooks (not shown) or, alternatively, with screws (not shown), but alternative exemplary embodiments are not limited thereto.

The liquid crystal panel 400 according to an exemplary embodiment of the present invention may be a touch screen which detects a position of a touch, e.g., an external pressure applied by a user, for example, thereon. The liquid crystal panel 400 will now be described in further detail with reference to FIG. 4. It will be noted that the touch screen panel may be classified as a capacitive touch screen panel, a resistive touch screen panel and a surface ultrasonic wave touch screen panel, for example. For purposes of explanation, a resistive touch screen panel will hereinafter be described, but alternative exemplary embodiments of the present invention are not limited thereto.

Referring now to FIG. 4, a gate electrode 26 is formed on an insulating substrate 10 of the liquid crystal panel 400 according to an exemplary embodiment of the present invention. A first touch sensor electrode 29 is formed on the insulating substrate 10 as a protrusion therefrom and is spaced apart from the gate electrode 26, as shown in FIG. 4. The first touch sensor electrode 29 is a terminal of a touch sensor and is connected to a first touch sensor pad 84 through a contact hole 72. When an external pressure is applied, e.g., when a user touches the liquid crystal panel 400 with the pen PEN, for example, the first touch sensor electrode 29 is electrically connected to a common electrode 90 on a touch sensor spacer 92, and thus provides touch position information to the central processing device 15 (FIG. 1).

A gate insulation layer 30 is formed of silicon nitride ("SiNx"), for example, on the gate electrode 26 and the first touch sensor electrode 29.

A semiconductor layer 40 is formed of hydrogenated amorphous silicon or polycrystalline silicon, for example, on the gate insulation layer 30.

Resistive contact layers 55 and 56 are formed of silicide or n+ hydrogenated amorphous silicon, for example, which is doped with a high concentration of n-type impurities, on the semiconductor layer 40.

A data line 62 and a drain electrode 66 are formed on the resistive contact layers 55 and 56 and the gate insulation layer 30, as shown in FIG. 4. A source electrode 65 extends from the data line 62 and over a portion of the semiconductor layer 40. The drain electrode 66 is spaced apart from the source electrode 65 and is disposed above the semiconductor layer 40. Further, the source electrode 65 and the drain electrode 66 are disposed on opposite sides of the gate electrode 26 above the semiconductor layer 40. Thus, the gate electrode 26, the source electrode 65 and the drain electrode 66 form a switching device, e.g., a thin film transistor such as the switching device Qp (FIG. 3). The drain electrode 66 according to an exemplary embodiment of the present invention may include a bar-shaped pattern, e.g., a rectangular-shaped pattern, which extends over a portion of the semiconductor layer 40, as well as a drain electrode expanded portion 67, which has a wider area than an area of the bar-shaped pattern and above which a contact hole 76 is formed through a passivation layer 70.

A second touch sensor electrode 63 is formed on the gate insulation layer 30. The second touch sensor electrode 63 is a terminal of a touch sensor and is connected to a second touch sensor pad 85 through a contact hole 73. When the external pressure is applied, e.g., by a user pressing the pen PEN against the LC panel 400, as shown in FIG. 4, the second touch sensor electrode 63 is electrically connected to the common electrode 90 on the touch sensor spacer 92, and thus provides touch position information. In an exemplary embodiment, the first touch sensor electrode 29 provides a row-direction coordinate of a touch position, while the second touch sensor electrode 63 provides a column-direction coordinate of the touch position, but alternative exemplary embodiments of the present invention are not limited thereto.

The passivation layer 70 is formed on the source electrode 65, the drain electrode 66 and the second touch sensor electrode 63, as shown in FIG. 4.

A pixel electrode 82 is formed on the passivation layer 70, and is electrically connected to the drain electrode 66 through the contact hole 76. The pixel electrode 82, to which an image data voltage is applied, generates an electric field along with the common electrode 90 and thus determines a alignment of liquid crystal molecules (not shown) in a liquid crystal layer 300 between the pixel electrode 82 and the common electrode 90.

The first touch sensor pad 84 and the second touch sensor pad 85 are formed on the passivation layer 70. The first touch sensor pad 84 is connected to the first touch sensor electrode 29 through the contact hole 72, and the second touch sensor pad 85 is connected to the second touch sensor electrode 63 through the contact hole 73.

Still referring to FIG. 4, the second display panel 200 will now be described in further detail. A black matrix 94 and a color filter 98 are formed on an insulating substrate 96. In an exemplary embodiment of the present invention, the color filter 98 includes as a red color filter 89, a green color filter 98 and/or a blue color filter 98. The black matrix 94 prevents light leakage through the liquid crystal panel 400.

The touch sensor spacer 92 is formed on the black matrix 94, as shown in FIG. 4.

The common electrode 90 according to an exemplary embodiment of the present invention is formed of a transparent conductive material such as indium tin oxide ("ITO") or indium zinc oxide ("IZO") on the black matrix 94, the color filter 98 and the touch sensor spacer 92.

A supporting spacer 93 is formed on the common electrode 90. The supporting spacer 93 supports the first display panel 100 and the second display panel 200 and thus maintains a uniform cell gap between the first display panel 100 and the second display panel 200.

Initially, the touch sensor spacer 92 is separate from the first display panel 100. However, when the external pressure is applied, the common electrode 90 on the touch sensor spacer 92 contacts and electrically connects to the first touch sensor pad 84 and the second touch sensor pad 85, as shown in FIG. 4. As a result, the LCD 11 recognizes a touch position, and outputs the touch position information to a central processing device 15 (FIG. 1).

Hereinafter, an operation in which the LCD 11 recognizes a shape of the object OB disposed on the liquid crystal panel 400 will be described in further detail with reference to FIG. 5.

Referring to FIG. 5, first light sources 610_1 through 610_4, second light sources IRLED_1 through IRLED_3 and sensors SEN_1 and SEN_2 are disposed below the liquid crystal panel 400.

More specifically, the first light sources 610_1 through 610_4 are disposed below the liquid crystal panel 400 and provide light to the liquid crystal panel 400. The first diffusion member 620 is disposed between the liquid crystal panel 400 and the first light sources 610_1 through 610_4, and improves a uniformity of a luminance of light emitted therefrom. The second light sources IRLED_1 through IRLED_3 are disposed below the liquid crystal panel, and more specifically, are disposed below the first diffusion member 620, as shown in FIG. 5. The second light sources IRLED_1 through IRLED_3 emit the sensing signal SIG toward the liquid crystal panel 400, e.g., upward in FIG. 5, to recognize the shape of the object OB. Specifically, the sensing signal SIG emitted by the second light sources IRLED_1 through IRLED_3 transmits through the liquid crystal panel 400, reaches the object OB, and is reflected from the object OB back toward the second light sources IRLED_1 through IRLED_3.

The sensors SEN_1 and SEN_2 are disposed on the first diffusion member 620 below the liquid crystal panel 400. Thus, the sensors SEN_1 and SEN_2 detect the sensing signal SIG reflected from the object OB before the reflected sensing signal SIG transmits through or is absorbed by the first diffusion member 620. Therefore, an efficiency of detection of the sensing signal SIG is substantially increased in an LCD 11 according to an exemplary embodiment of the present invention.

Still referring to FIG. 5, the sensors SEN _1 and SEN_2 recognize a shape of the object OB by detecting the sensing signal SIG reflected from the object OB, and output object shape information regarding the object OB to central processing device 15 (FIG.

1). An arrangement and positions of the sensors SEN_1 and SEN_2, as well as a depth D of the sensors SEN_1 and SEN_2, is determined based on a viewing angle θ of the sensors SEN_1 and SEN_2. Specifically, as the depth D of the sensors SEN_1 and SEN_2 increase, the sensors SEN_1 and SEN_2 become less visible from above the liquid crystal panel 400, but the sensitivity of the sensors SEN_1 and SEN_2 decrease. Thus, the depth D is determined based upon sensitivities of the sensors SEN _1 and SEN_2 and the viewing angle θ. As shown in FIG. 5, the depth D represents a distance between the sensors SEN_1 and SEN_2 and a member, e.g., the liquid crystal panel 400, disposed directly above the sensors SEN_1 and SEN_2. In an exemplary embodiment of the present invention, the depth D is less than or equal to approximately 100 mm.

Each of the sensors SEN_1 and SEN_2 may include an infrared filter (not shown), which detects infrared rays. In an exemplary embodiment of the present invention, the sensors SEN_1 and SEN_2 detect infrared rays having a long wavelength, e.g., a wavelength of approximately 700 nm or more, with the infrared filters.

Thus, the LCD 11 according to an exemplary embodiment of the present invention functions as both a touch screen panel, which can detect a position of a touch on the liquid crystal panel 400, as well as determining a shape of an object OB on the liquid crystal panel 400. Therefore, the LCD 11 according to an exemplary embodiment provides an easy and convenient interface to a user. However, alternative exemplary embodiments of the present invention are not limited to the abovementioned examples. Instead, the LCD 11 according to an alternative exemplary embodiment may include only one of a touch screen function and a shape recognition function. Put another way, the LCD 11 according to an alternative exemplary embodiment recognizes a shape of an object OB on the liquid crystal panel 400, but may not necessarily be a touch screen panel.

An LCD according to an alternative exemplary embodiment of the present invention will now be described in further detail with reference to FIG. 6.

Figure 6:
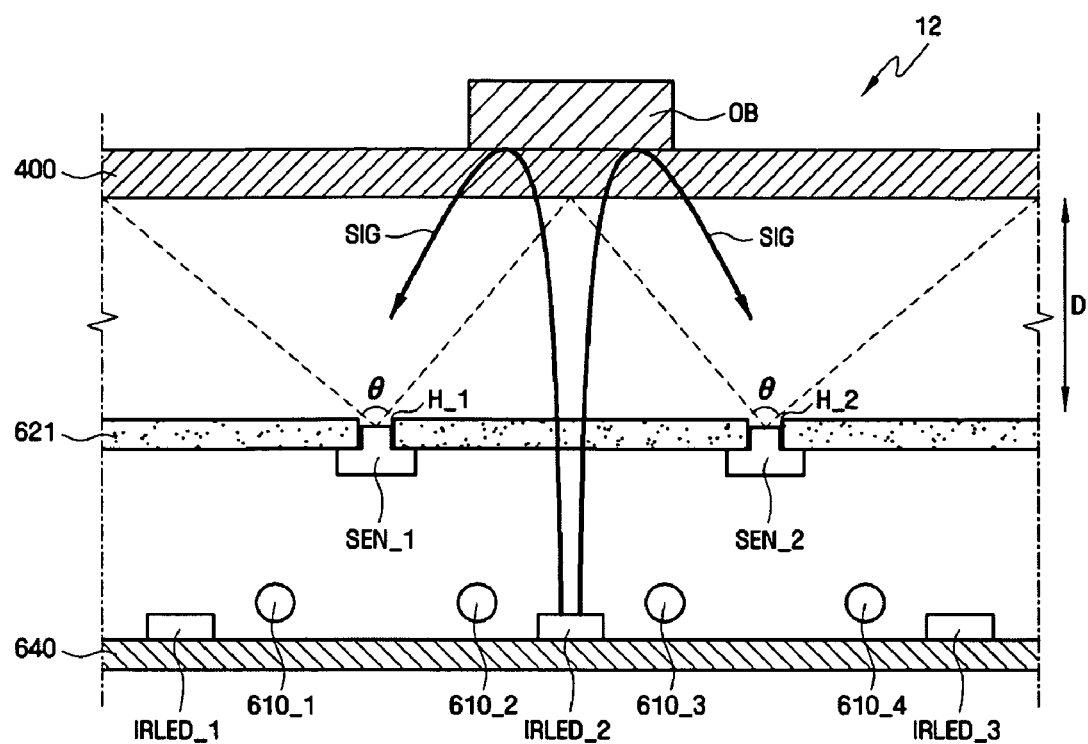
FIG. 6 is a partial cross-sectional view of an LCD according to an alternative exemplary embodiment of the present invention.

FIG. 6 is a partial cross-sectional view of an LCD 12 according to an alternative exemplary embodiment of the present invention. In FIGS. 5 and 6, the same reference numerals indicate the same or like elements, and thus, any repetitive detailed description thereof will be omitted. The exemplary embodiment shown in FIG. 6 will hereinafter be described in further detail, to describe differences between the exemplary embodiment shown in FIG. 6 and the exemplary embodiment shown in FIG. 5.

Referring to FIG. 6, one or more holes, e.g., holes H_1 and H_2, are formed through a first diffusion member 621, and sensors SEN_1 and SEN_2 are inserted into corresponding holes H_1 and H_2. Therefore, the sensors SEN_1 and SEN_2 detect the sensing signal SIG reflected from an object OB away from the LC panel 400 and back toward the sensors SEN_1 and SEN_2 before the sensing signal SIG transmits through or is absorbed by the first diffusion member 621.

A size of each of the holes H_1 and H_2 is determined such that the holes H_1 and H_2 are not visible from a viewing position outside, e.g., above, the liquid crystal panel 400. Further, the size of each of the holes H_1 and H_2 maybe determined by a size of the sensors SEN_1 and SEN_2. For example, a diameter of the holes H_1 and H_2 according to an exemplary embodiment of the present invention is approximately 5 mm or less.

An LCD according to another alternative exemplary embodiment of the present invention will now be described in further detail with reference to FIG. 7.

Figure 7:
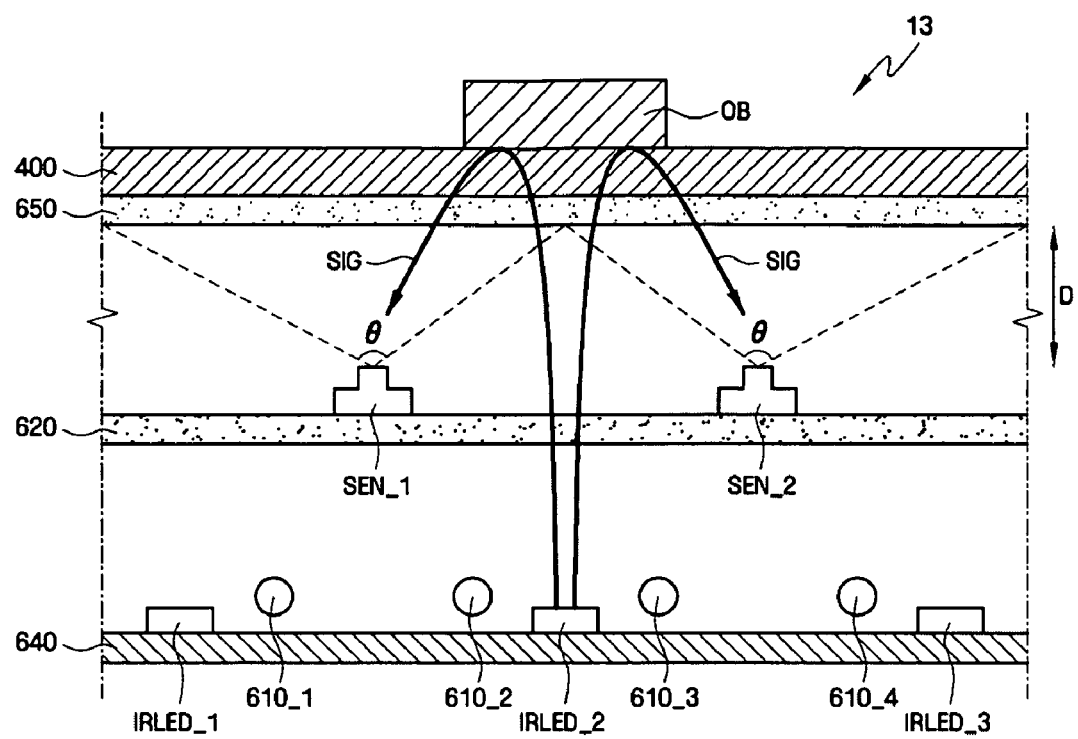
FIG. 7 is a partial cross-sectional view of an LCD according to another alternative exemplary embodiment of the present invention.

FIG. 7 is a partial cross-sectional view of an LCD 13 according to another alternative exemplary embodiment of the present invention. In FIGS. 5 and 7, the same reference numerals indicate the same or like elements, and thus, any repetitive detailed description thereof will be omitted. The exemplary embodiment shown in FIG. 7 will hereinafter be described in further detail to describe differences between the exemplary embodiment shown in FIG. 7 and the exemplary embodiment shown in FIG. 5.

Referring to FIG. 7, a second diffusion member 650 is disposed between the liquid crystal panel 400 and the first diffusion member 620. More specifically, the second diffusion member 650 is disposed on a bottom surface of the liquid crystal panel 400, e.g., on a side of the liquid crystal panel 400 closest to the first diffusion member 620, as shown in FIG. 7.

The first diffusion member 620 diffuses light emitted from the first light sources 610_1 through 610_4 and thus provides the light to the liquid crystal panel 400. In addition, the first diffusion member 620 prevents the first light sources 610_1 through 610_4 and the second light sources IRLED_1 through IRLED_3 from being seen from outside, e.g., above, the liquid crystal panel 400.

The second diffusion member 650 prevents the sensors SEN_1 and SEN2 from being seen from above the liquid crystal panel 400. Further, the second diffusion member 650 diffuses light and provides the light to the liquid crystal panel 400.

Figure 8:
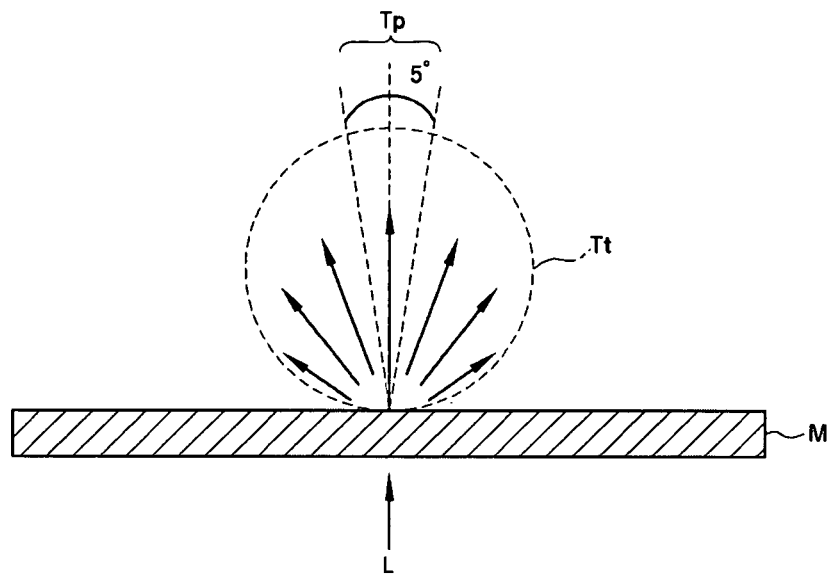
FIG. 8 is a partial cross sectional view of light incident upon a diffusion member which illustrates parallel transmittances according to an exemplary embodiment of the present invention.

In an exemplary embodiment, a parallel transmittance of the second diffusion member 650 may be greater than a parallel transmittance of the first diffusion member 620, as will hereinafter be described in further detail with reference to FIG. 8. FIG. 8 is a partial cross sectional view of light incident upon a diffusion member which illustrates parallel transmittances according to an exemplary embodiment of the present invention. Parallel transmittance is defined as a ratio of a luminance of light emitted through diffusion member, e.g., the first diffusion member 620 or the second diffusion member 650, at an angle within approximately 5 degrees of an incidence direction of the light to a total luminance of all light emitted through the diffusion member. Specifically, referring to FIG. 8, when light L incident upon a diffusion member M transmits through the diffusion member M, the light L transmitted through the diffusion member M is emitted toward all directions. In this case, a ratio of a luminance $T_p$ of the light emitted through the diffusion member M at an angle within approximately 5 degrees of an incidence direction of the light L to a total luminance $T_1$ of all light L emitted through the diffusion member M is defined as parallel transmittance.

Referring again to FIG. 7, the sensing signal SIG (e.g., infrared rays) is reflected from the object OB and is input to, e.g., is sensed by, the sensors SEN_1 and SEN_2 through the second diffusion member 650. Thus, an increased parallel transmittance of the second diffusion member 650 results in an improved performance of the sensors SEN_1 and SEN_2. However, if the parallel transmittance of the second diffusion member 650 is too high, the sensors SEN_1 and SEN_2 can be seen from above, e.g., outside, the liquid crystal panel 400, and thus, the parallel transmittance of the second diffusion member 650 according to an exemplary embodiment of the present invention is in a predetermined range, for example, of approximately 25% to—approximately 35%. Further, the parallel transmittance of the second diffusion member 650 in an alternative exemplary embodiment of the present invention may be altered according to the depth D (FIG. 7) and the viewing angle θ (FIG. 7) of the sensors SEN_1 and SEN_2.

An LCD according to another alternative exemplary embodiment of the present invention will now be described in further detail with reference to FIG. 9.

Figure 9:
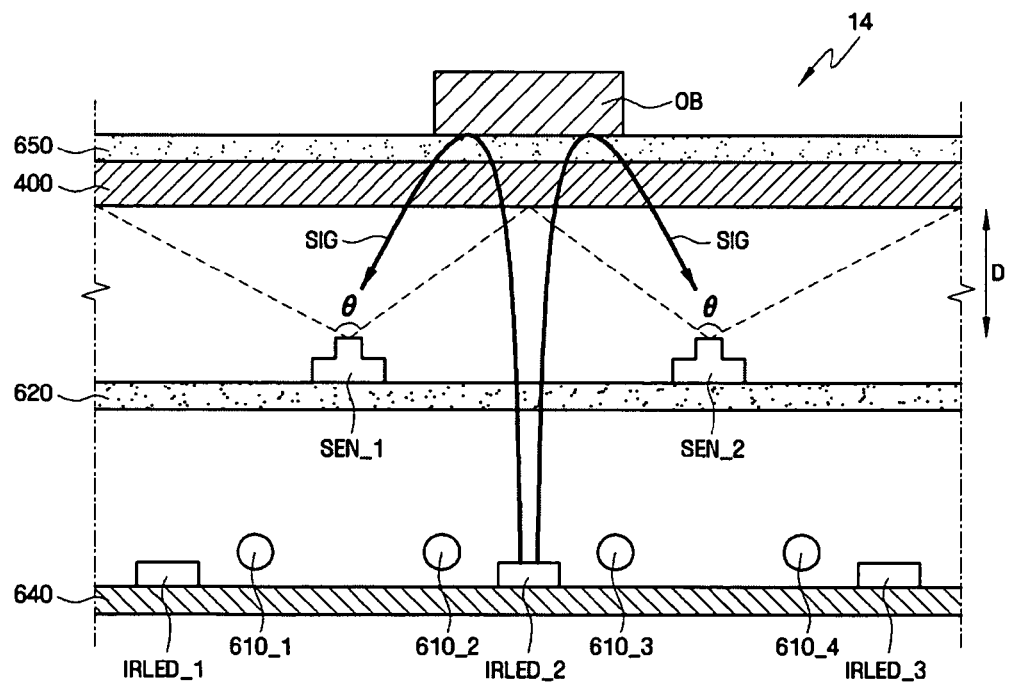
FIG. 9 is a partial cross-sectional view of an LCD according to still another alternative exemplary embodiment of the present invention.

FIG. 9 is a cross-sectional view of an LCD 14 according to another exemplary embodiment of the present invention. In FIGS. 7 and 9, the same reference numerals indicate the same or like elements, and thus, any repetitive detailed description thereof will be omitted. The exemplary embodiment shown FIG. 9 will hereinafter be described in further detail to describe on differences between the exemplary embodiment shown FIG. 9 and the exemplary embodiment shown in FIG. 7.

Referring to FIG. 9, a second diffusion member 650 is disposed on an upper, e.g., a top, surface of the liquid crystal panel 400. The second diffusion member 650 prevents the sensors SEN_1 and SEN_2 from being seen from above, e.g., from outside, the liquid crystal panel 400.

In an exemplary embodiment of the present invention, the parallel transmittance of the second diffusion member 650 is greater than the parallel transmittance of a first diffusion member 620, as described in greater detail above. Specifically, the parallel transmittance of the second diffusion member 650 may be, for example, in a range of approximately 25% to approximately 35%. In addition, the parallel transmittance of the second diffusion member 650 may be altered based on the depth D and the viewing angle θ of the sensors SEN_1 and SEN_2.

An LCD according to another embodiment of the present invention will now be described in further detail with reference to FIG. 10.

Figure 10:
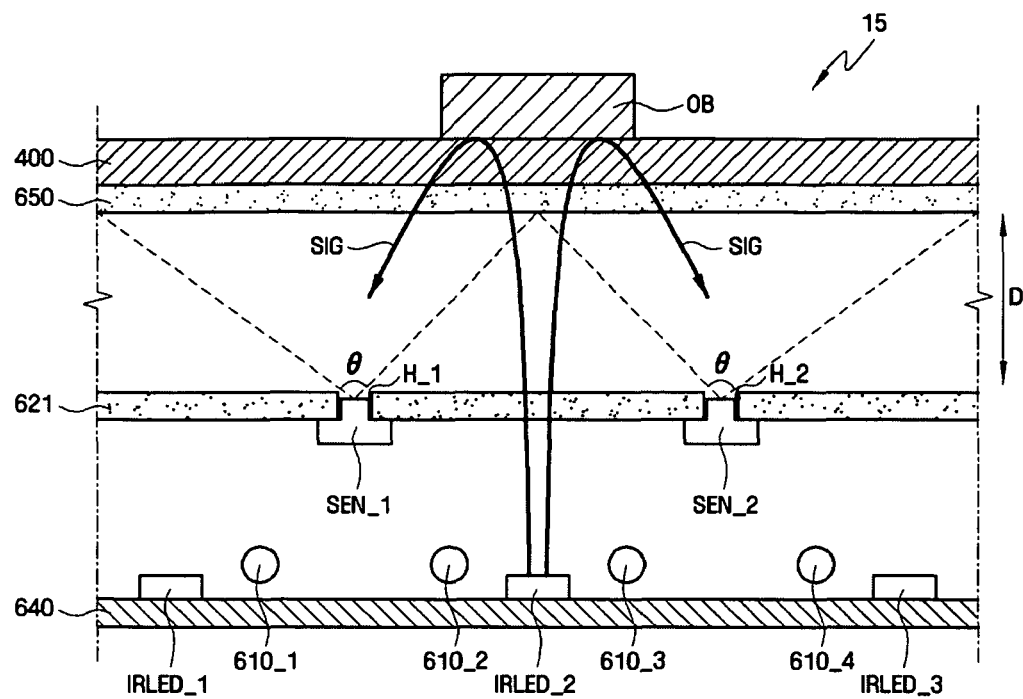
FIG. 10 is a partial cross-sectional view of an LCD according to yet another alternative exemplary embodiment of the present invention.

FIG. 10 is a partial cross-sectional view of an LCD 15 according to still another alternative exemplary embodiment of the present invention. In FIGS. 6, 7 and 10, the same reference numerals indicate the same or like elements, and thus, and repetitive detailed description thereof will be omitted. The exemplary embodiment shown in FIG. 10 will hereinafter be described in further detail to describe differences between the exemplary embodiment shown in FIG. 10 and the exemplary embodiment shown in FIGS. 6 and 7.

Referring to FIG. 10, a second diffusion member 650 is disposed between the liquid crystal panel 400 and the first diffusion member 620. More specifically, the second diffusion member 650 is disposed on a lower surface, e.g., a bottom surface, of the liquid crystal panel 400. The second diffusion member 650 prevents the sensors SEN_1 and SEN_2 and the holes H_1 and H_2 from being seen from outside, e.g., above, the liquid crystal panel 400.

The parallel transmittance of the second diffusion member 650 according to an exemplary embodiment of the present invention is greater than the parallel transmittance of the first diffusion member 620. Specifically, the parallel transmittance of the second diffusion member 650 may have, for example, a range of approximately 25% to approximately 35%. The parallel transmittance of the second diffusion member 650 may be altered, however, according to the depth D and the viewing angle θ of the sensors SEN_1 and SEN_2.

An LCD according to another alternative exemplary embodiment of the present invention will hereinafter be described in further detail with reference to FIG. 11.

Figure 11:
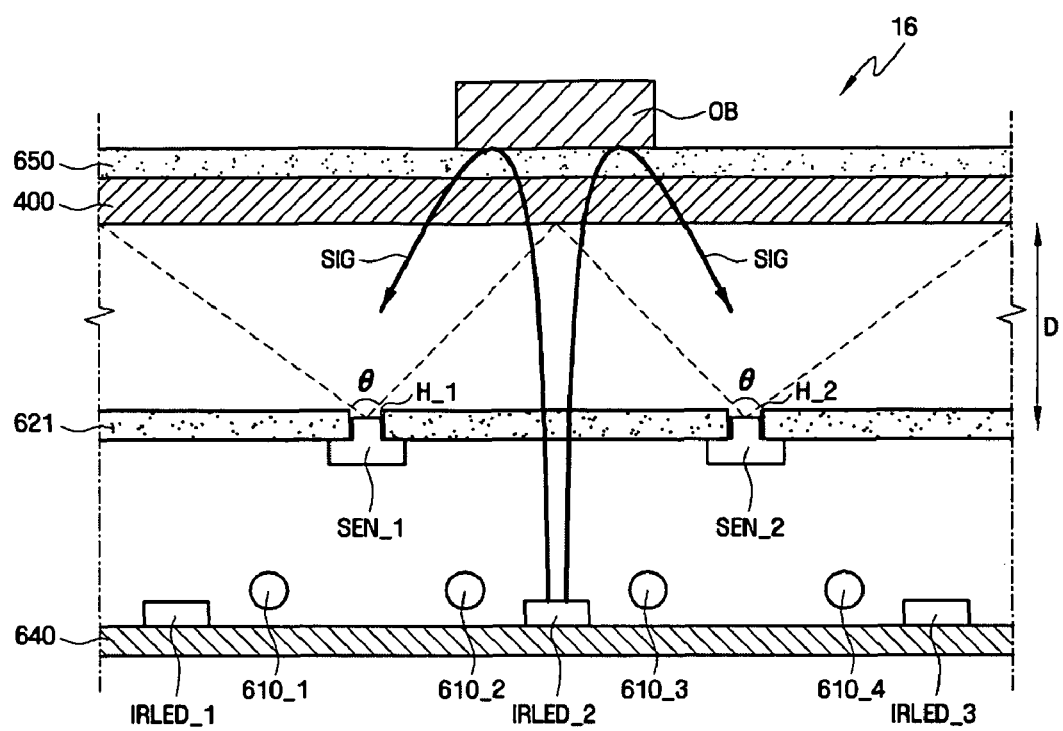
FIG. 11 is a partial cross-sectional view of an LCD according to another alternative exemplary embodiment of the present invention.

FIG. 11 is a partial cross-sectional view of an LCD 16 according to another alternative exemplary embodiment of the present invention. In FIGS. 10 and 11, the same reference numerals indicate the same or like elements, and thus, any repetitive detailed description thereof will be omitted. The exemplary embodiment shown in FIG. 11 will hereinafter be described in further detail to describe differences between the exemplary embodiment shown in FIG. 11 and the exemplary embodiment shown in FIG. 10.

Referring to FIG. 11, a second diffusion member 650 is disposed on an upper surface, e.g., a top surface, of the liquid crystal panel 400. The second diffusion member 650 prevents the sensors SEN_1 and SEN_2 and the holes H_1 and H_2 from being seen from above, e.g., from outside, the liquid crystal panel 400.

As described above in greater detail, the parallel transmittance of the second diffusion member 650 is greater than the parallel transmittance of the first diffusion member 620. In an exemplary embodiment of the present invention, for example, the parallel transmittance of the second diffusion member 650 is in a range from approximately 25% to approximately 35%. Furthermore, the parallel transmittance of the second diffusion member 650 may be altered based on the depth D and the viewing angle θ of the sensors SEN_1 and SEN_2.

An LCD according to another embodiment of the present invention will now be described in further detail with reference to FIGS. 12 and 13.

Figure 12:
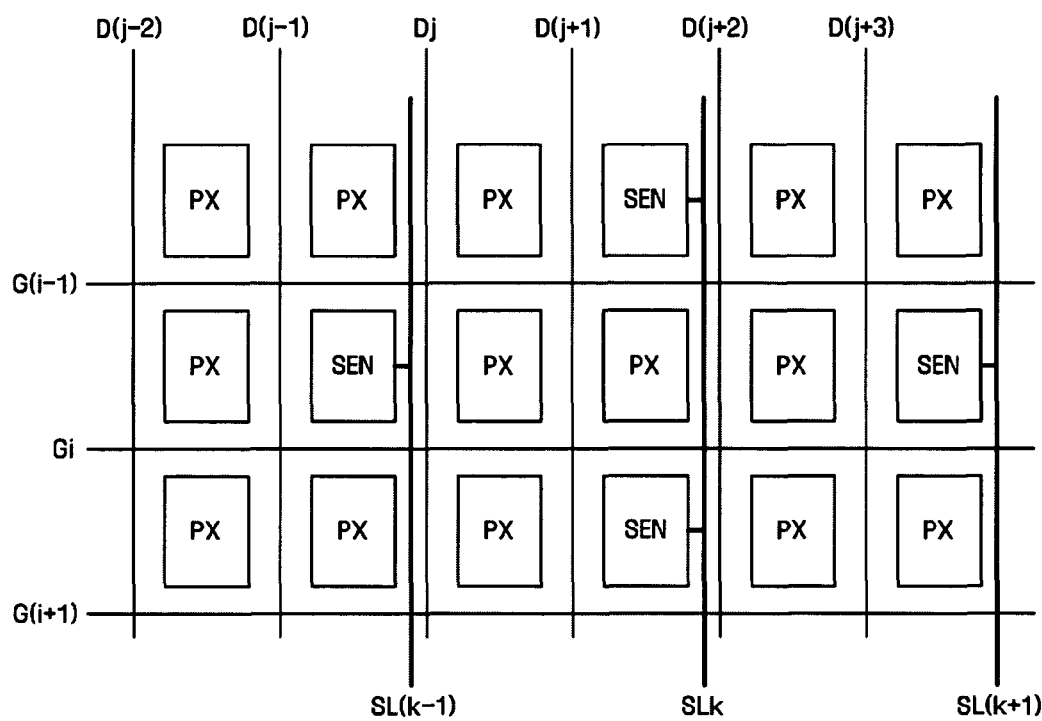
FIG. 12 is a plan view of a liquid crystal panel according to an exemplary embodiment of the present invention.
Figure 13:
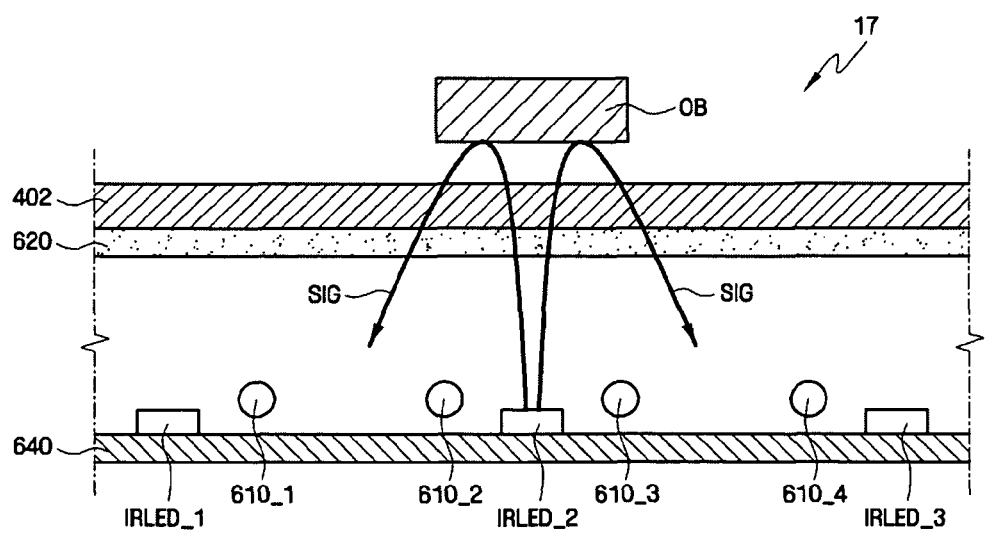
FIG. 13 is a partial cross-sectional view of an LCD according to still another alternative exemplary embodiment of the present invention.

FIG. 12 a plan view of a liquid crystal panel according to another alternative exemplary embodiment of the present invention, and FIG. 13 is a partial cross-sectional view of an LCD 17 according to still another alternative exemplary embodiment of the present invention. In FIGS. 5 and 13, the same reference numerals indicate the same or like elements, and thus, any repetitive detailed description thereof will be omitted. The exemplary embodiment shown in FIG. 13 will hereinafter be described in further detail to describe differences between the exemplary embodiment shown in FIG. 13 and the exemplary embodiment shown in FIG. 5.

Referring to FIGS. 12 and 13, a plurality of sensors SEN are disposed in a liquid crystal panel 402. For example, the sensors SEN may be disposed in a substantially matrix pattern among a plurality of the pixels PX, as shown in FIG. 12. Further, sensors SEN of the plurality of sensors SEN may be mounted on one of the first display panel 100 (FIG. 2) and the second display panel 200 (FIG. 2) of the liquid crystal panel 402. For example, the sensors SEN may be formed on the first display panel 100, on which a thin-film transistor ("TFT") array is formed, along with the switching devices Qp (FIG. 3) of the pixels PX.

The sensing signal SIG emitted from the second light sources IRLED_1 through IRLED_3 is reflected back toward the second light sources IRLED_1 through IRLED_3 by an object OB disposed on the liquid crystal panel 402, and a reflected sensing signal SIG is detected by the sensors SEN (FIG. 12) in the liquid crystal panel 402 (FIG. 13). The sensors SEN output object shape information regarding the object OB to the central processing device 15 (FIG. 1) through a plurality of sensor lines SL(k−1), SLk and SL(k+1).

A method of recognizing, e.g., determining, a shape of an object using an LCD according to an exemplary embodiment of the present invention will now be described in further detail with reference to FIGS. 14 through 18. FIGS. 14 through 18 are plan views of a liquid crystal panel which illustrate a method of recognizing an object using an LCD according to an exemplary embodiment of the present invention. The exemplary embodiment shown in FIGS. 14 through 18 will hereinafter be described in further detail, using the LCD 11 according to the exemplary embodiment of the present invention shown in FIG. 5 as an example for purposes of illustration only, e.g., methods of recognizing an object using an LCD according to alternative exemplary embodiments of the present invention are not limited to the LCD 11 shown in FIG. 5.

Referring to FIG. 5, the second light sources IRLED_1 through IRLED_3 emit the sensing signal SIG toward the liquid crystal panel 400 in order to recognize the shape of the object OB, which is disposed on the liquid crystal panel 400, e.g., is proximate to the liquid crystal panel 400 outside the liquid crystal panel 400. The sensing signal SIG transmits through the liquid crystal panel 400, and is reflected by the object OB away from the liquid crystal panel 400, e.g., is reflected back toward the second light sources IRLED_1 through IRLED_3. The reflected sensing signal SIG is detected by the sensors SEN_1 and SEN_2.

The sensing signal SIG detected by the sensors SEN_1 and SEN_2 is subjected to correction, thereby obtaining object shape information regarding the object. Then, the object shape information is output to the central processing unit 15 (FIG. 1).

An operation in which the sensors SEN_1 and SEN_2 detect the sensing signal SIG and correct the detected sensing signal SIG will now be described in further detail with reference to FIGS. 14 through 18.

Figure 14:
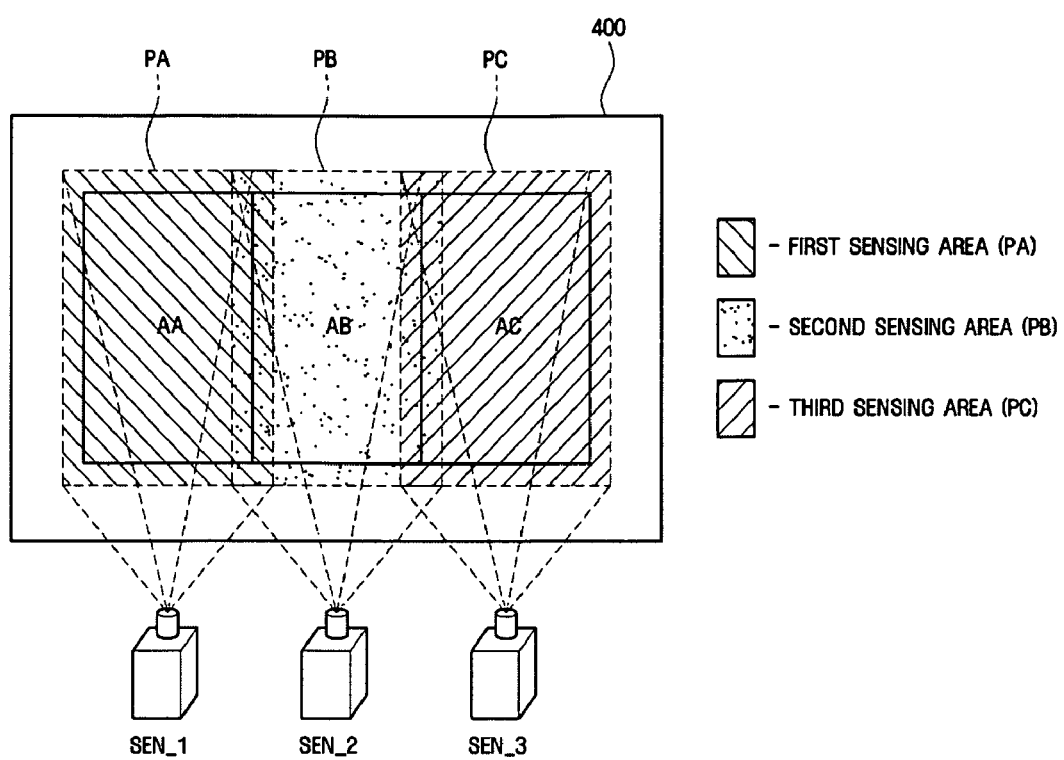
FIGS. 14 through 18 are plan views of a liquid crystal panel for explaining a method of recognizing an object using an LCD according to an exemplary embodiment of the present invention.

Referring to FIG. 14, the liquid crystal panel 400 is divided into a plurality of active regions. Specifically, the liquid crystal panel 400 is divided into a first active region AA, a second active region AB and a third active region AC. A plurality of sensors, e.g., a first sensor SEN_1, a second sensor SEN_2 and a third sensor SEN_3 corresponding to the first active region AA, the second active region AB and the third active region AC, respectively, are provided, as described in greater detail above. In an exemplary embodiment, the liquid crystal panel 400 is divided into three active regions, and three sensors are provided, as shown in FIG. 14. However, alternative exemplary embodiments of the present invention are not limited thereto.

More specifically, the first sensor SEN_1 detects a sensing signal (not shown) which transmits through the first active region AA, the second sensor SEN_2 detects a sensing signal (not shown) which transmits through the second active region AB, and the third sensor SEN_3 detects a sensing signal (not shown) which transmits through the third active region AC.

A first sensing area PA, which is a coverage area of the first sensor SEN_1 includes the first active region AA and is also larger than the first active region AA. A second sensing area PB, which is a coverage area of the second sensor SEN_2, includes the second active region AB and is likewise larger than the second active region AB. A third sensing area PC, which is a coverage area of the third sensor SEN_3, includes the third active region AC and is also larger than the third active region AC.

Therefore, the first, second and third sensing areas PA, PB and PC, respectively, partially overlap one another, as shown in FIG. 14. Thus, the first, second and third sensors SEN_1, SEN_2 and SEN_3, respectively, detect all corresponding sensing signals which transmit through the liquid crystal panel 400 to a respective sensor SEN of the first sensor SEN_1, the second sensor SEN_2 and the third sensor SEN_3.

Any redundancy in sensing signals detected by the first, second and/or third sensors SEN_1, SEN_2 and/or SEN_3, respectively, is corrected for in an exemplary embodiment of the present invention. Specifically, only sensing signals regarding the first, second and third active regions AA, AB, and AC, respectively, are extracted from sensing signals based on the first, second and third sensing areas PA, PB and PC, respectively.

Figure 15:
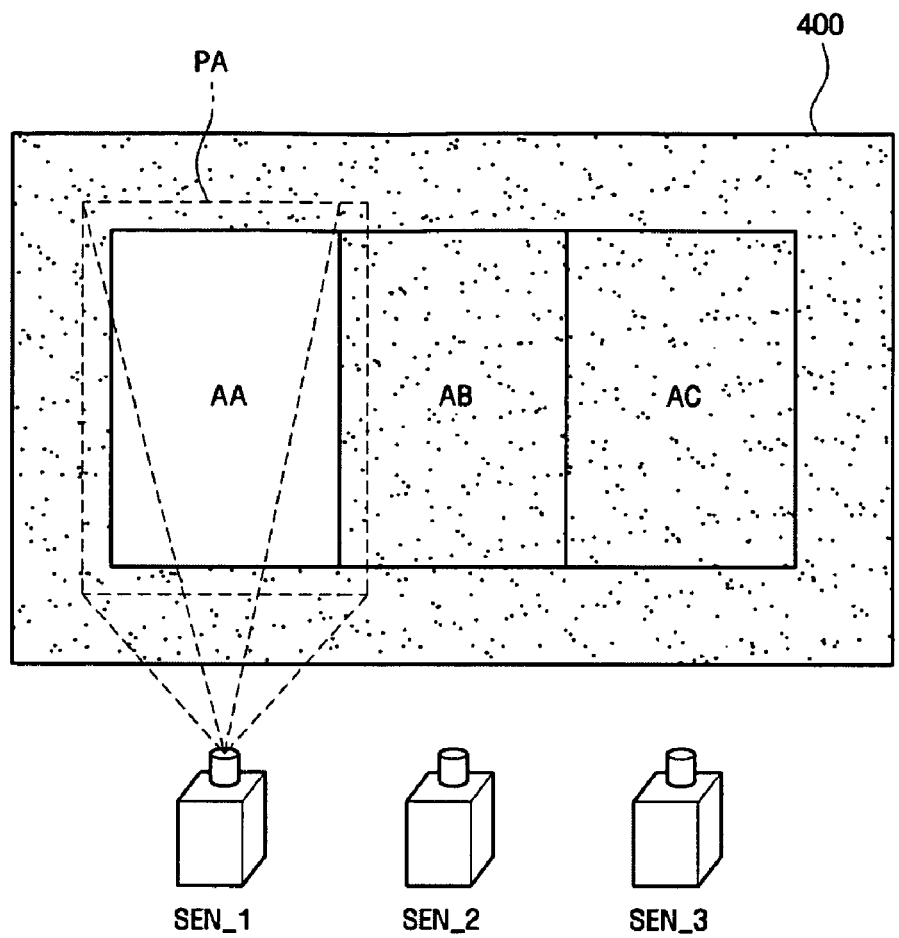

More specifically, referring to FIG. 15, a first test image such as a white image is displayed in the first active region AA of the liquid crystal panel 400, and a second test image such as a black image is displayed on the whole liquid crystal panel 400 except for the first active region AA. The first sensor SEN_1 detects portions of both the first test image and the second test image which fall within the coverage area of the first sensor SEN_1, e.g., the first sensing area PA. Put another way, the first sensor SEN_1 detects the first test image and a portion of the second test image.

Figure 16:
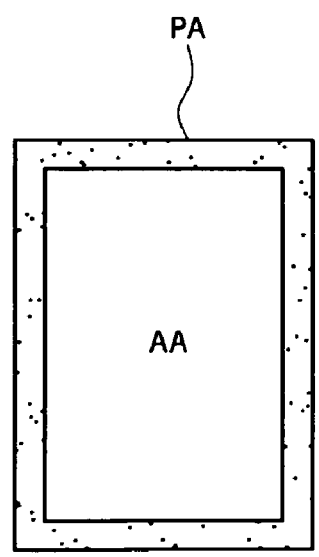

Thereafter, referring to FIG. 16, coordinates of the first test image and coordinates of a portion of the second test image which falls within the first sensing area PA are determined. In an exemplary embodiment of the present invention, the coordinates of the first test image may be substantially the same as coordinates of the first active region AA.

Figure 17:
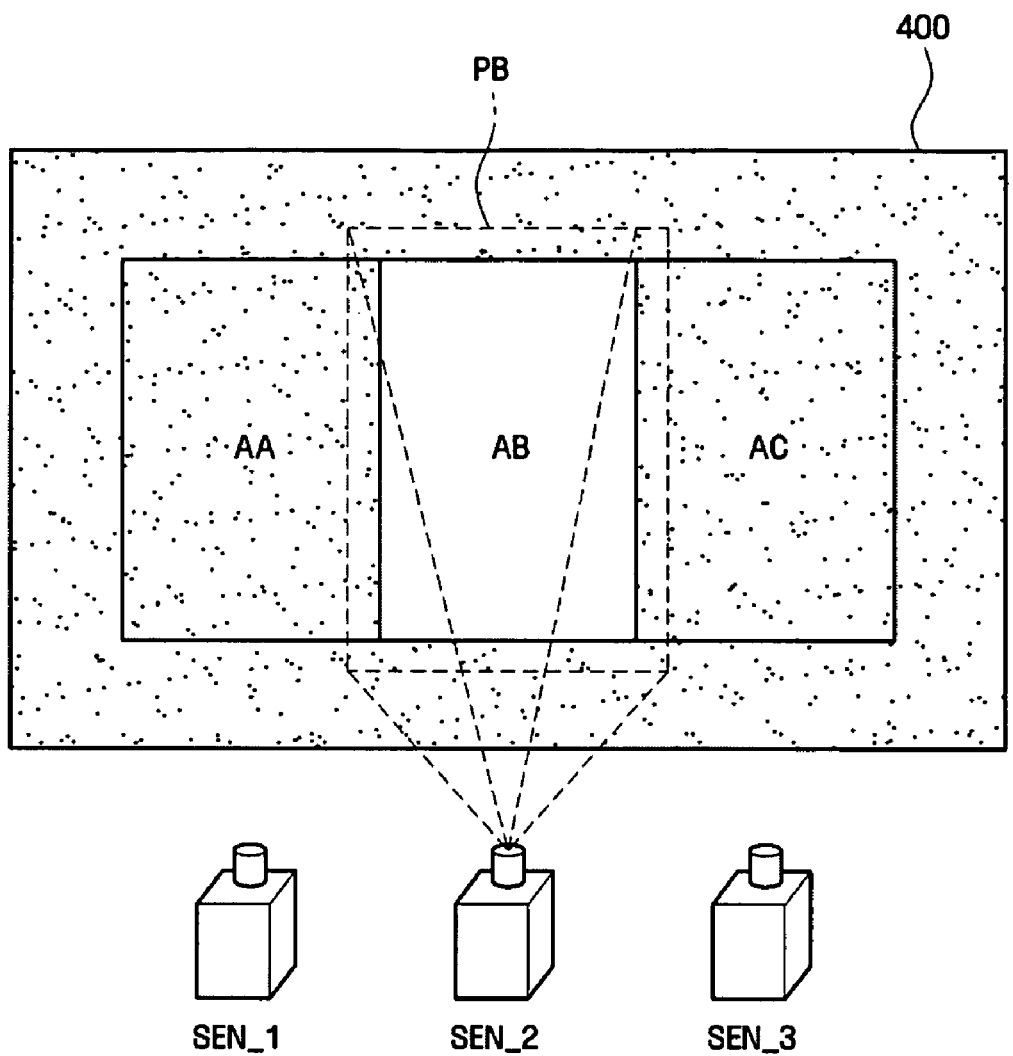

Referring to FIG. 17, the second sensor SEN_2, like the first sensor SEN_1, detects portions of the first test image and the second test image which fall within the coverage area of the second sensor SEN_2, e.g., the second sensing area PB. The third sensor SEN_3, like the first and second sensors SEN_1 and SEN_2, respectively, detects portions of the first test image and the second test image which fall within the coverage of the third sensor SEN_3.

Figure 18:
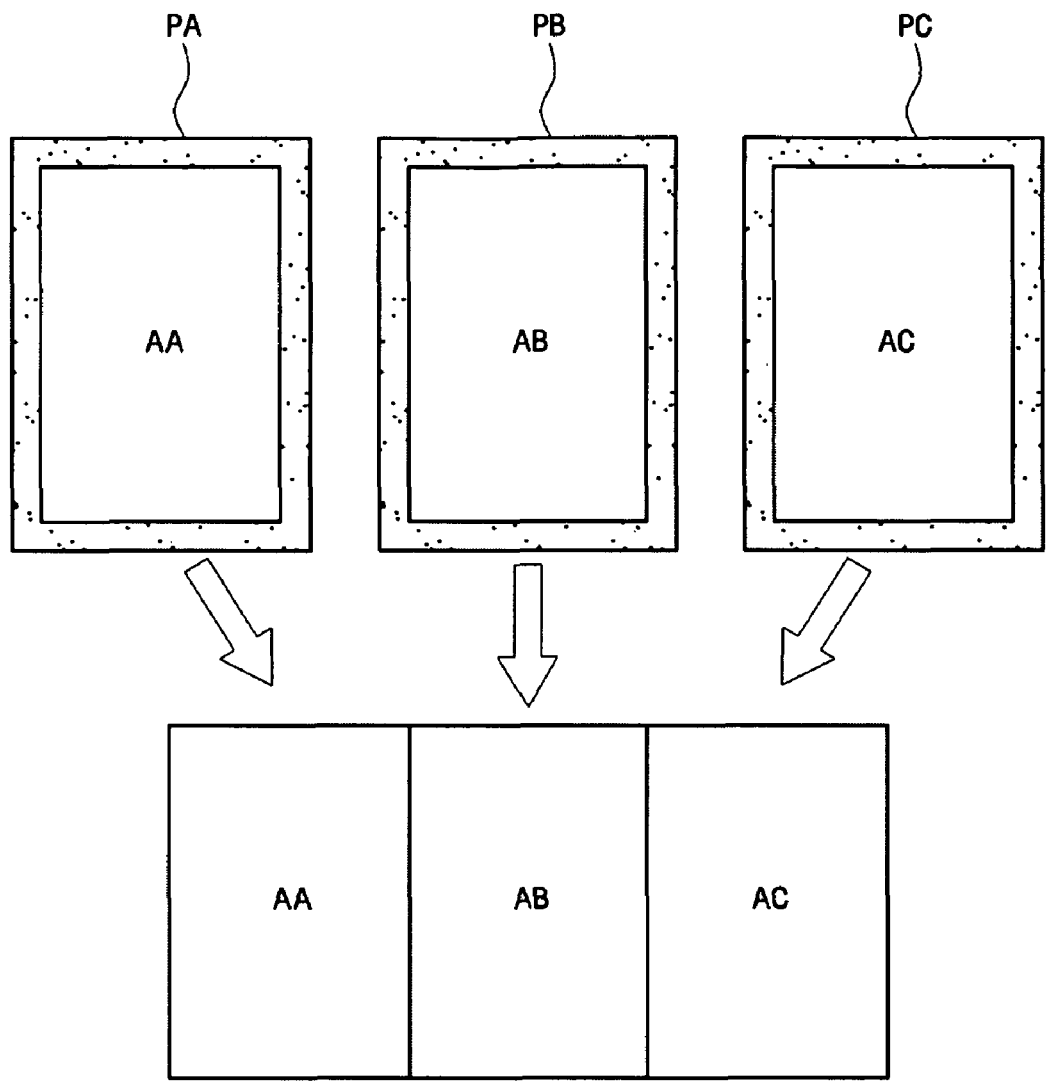

Thereafter, referring to FIG. 18, only the first test image is extracted from the results of the detection performed by each of the first, second and third sensors SEN_1, SEN_2, and SEN_3, respectively, and the extracted first test images are combined, thereby obtaining an image of the first, second and third active regions AA, AB, and AC, respectively.

Thus, the first, second and third sensors SEN_1, SEN_2 and SEN_3, respectively, each detect a sensing signal based on the active region AA, a sensing signal regarding the active region AB, and a sensing signal regarding the active region AC, respectively, by using the coordinates of the first test image. Thus, the first, second and third sensors SEN_1, SEN_2 and SEN_3, respectively, each detect a sensing signal regarding the sensing area PA, a sensing signal regarding the sensing area PB, and a sensing signal regarding the sensing area PC, respectively, remove portions of the respective sensing signals corresponding to the coordinates of a second test image, and extract and combine the remaining sensing signals, which correspond to the coordinates of the first test image, thereby providing object shape information for the object OB.

According to exemplary embodiments of the present invention as described herein, an LCD provides advantages which include, but are not limited to, a substantially increased efficiency of detection of a sensing signal.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A liquid crystal display comprising:
a liquid crystal panel;
a plurality of first light sources disposed below the liquid crystal panel;
a first diffusion member disposed between the liquid crystal panel and the plurality of first light sources;
a plurality of second light sources disposed below the liquid crystal panel and which emits a sensing signal toward the liquid crystal panel;
a plurality of sensors disposed one of in the liquid crystal panel and below the liquid crystal panel; and
a second diffusion member disposed one of between the liquid crystal panel and the first diffusion member, and on the liquid crystal panel, the second diffusion member disposed directly over the plurality of sensors,
wherein the sensing signal emitted from the plurality of second light sources toward the liquid crystal panel is reflected away from the liquid crystal panel toward the plurality of sensors by an object disposed above the liquid crystal panel, and
the sensing signal reflected from the object is detected by the plurality of sensors before transmitting through the first diffusion member away from the liquid crystal panel,
wherein parallel transmittance is defined as a ratio of a luminance of light emitted through a diffusion member at an angle within approximately 5 degrees of an incidence direction of the light to a total luminance of all light emitted through the diffusion member, and
the parallel transmittance of the second diffusion member is greater than a parallel transmittance of the first diffusion member.

2. The liquid crystal display of claim 1, wherein sensors of the plurality of sensors are disposed on the first diffusion member.

3. The liquid crystal display of claim 1, wherein
a plurality of apertures is formed through the first diffusion member, and
sensors of the plurality of sensors are disposed in apertures of the plurality of apertures.

4. The liquid crystal display of claim 1, further comprising a plurality of switching devices disposed in the liquid crystal panel, wherein sensors of the plurality of sensors are formed in the liquid crystal panel with the plurality of switching devices.

5. The liquid crystal display of claim 1, wherein the parallel transmittance of the second diffusion member is in a range of approximately 25 percent to approximately 35 percent.

6. The liquid crystal display of claim 1, wherein a distance between the liquid crystal panel and the plurality of sensors is less than or equal to approximately 100 mm.

7. The liquid crystal display of claim 1, wherein the sensing signal comprises one of infrared rays and ultrasonic waves.

8. The liquid crystal display of claim 1, wherein sensors of the plurality of sensors comprise an infrared filter which detects infrared rays having a wavelength greater than or equal to approximately 700 nm.

9. The liquid crystal display of claim 1, wherein the liquid crystal panel comprises a touch screen panel which recognizes a position of a an external pressure applied thereto.

10. The liquid crystal display of claim 1, wherein the plurality of sensors are disposed above at least one of the plurality of first light sources and the plurality of second light sources.

* * * * *